3,714,246
PROCESS FOR THE PRODUCTION OF 1-HALO-3-METHYL AND 1 - HALO - 2,4 - DIMETHYL-PHOSPHOLENES
Curtis P. Smith, Cheshire, and Henri Ulrich, North Branford, Conn., assignors to The Upjohn Company, Kalamazoo, Mich.
No Drawing. Filed June 1, 1971, Ser. No. 148,999
Int. Cl. C07d 105/02
U.S. Cl. 260—543 P  14 Claims

ABSTRACT OF THE DISCLOSURE

A process is disclosed for preparing 1-halo-3-methylphospholenes and 1-halo-3,4-dimethylphospholenes; said halo being selected from the group consisting of chlorine and bromine. The process comprises reacting an appropriate 1,1-dihalophospholenium halide with a hydrocarbyl phosphine in the presence of an inert organic solvent, and at a temperature of from 0° C. to reflux temperature.

The products of the process are useful as intermediates in a variety of chemical syntheses. For example, they are employed for the preparation of selective solvents, and catalysts for the preparation of carbodiimides from isocyanates.

BACKGROUND OF THE INVENTION

(1) Field of the invention

The invention is concerned with a process for preparing heterocyclic phosphorus compounds, and is more particularly concerned with a process for preparing 1-halo-3-methyl- and 1-halo-3,4-dimethylphospholenes from the corresponding 1,1-dihalophospholenium halides.

(2) Description of the prior art

Subsequent to our invention the preparation of 1-bromo-3-phospholene was described in a communication by Quin et al., J. Am. Chem. Soc., vol. 92, 5779 (1970). Also subsequent to our invention the prepartion of 1-halophospholenes was described by Myers et al., J. Org. Chem., 36, 1285–90 (1971).

SUMMARY OF THE INVENTION

The invention comprises a process for preparing a 1-halophospholene selected from the group consisting of 1-halo-3-methylphospholenes and 1-halo-3,4 - dimethylphospholenes which comprises reacting in the presence of an inert organic solvent, and at a temperature of from 0° C. to reflux temperature, the corresponding 1,1-dihalophospholenium halide with a hydrocarbyl phosphine; the halo in each instance being selected from the class consisting of chlorine and bromine.

The products of the process are valuable intermediates in a variety of syntheses. For example the products of the process may be used in preparing selective solvents and in obtaining catalysts for the preparation of carbodiimides from isocyanates. Methods of preparing useful compounds from the products of the process are discussed in more detail hereinafter.

DETAILED DESCRIPTION OF THE INVENTION

The process of the invention is carried out by admixing substantially equimolar proportions of a hydrocarbyl phosphine with a 1,1-dihalophospholenium halide. Admixture of the reactants is carried out in the presence of an inert organic solvent, employing conventional apparatus. Thus, admixture is performed in any conventional and appropriate reaction vessel.

The 1,1-dihalophospholenium halide reactants are generally only slightly soluble in the solvents employed, and the intial reaction mixture is a slurry. As the reaction proceeds, the reaction product goes into solution, and the amount of insoluble material decreases. Eventually, the slurry mixture becomes a clear solution of reaction product with a relatively small amount of insoluble by-product.

Since stirring the reaction mixture assists the reaction, it is advantageous to employ a reaction vessel fitted with a means for continuous stirring of a slurry mixture.

By the process of the invention, the phosphorus atom in the phospholenium halide (I) is reduced from the pentavalent to the trivalent state, with partial dehalogenation of the phospholenium halide. The reaction can be represented schematically by the equation:

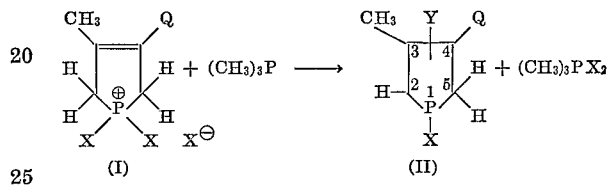

wherein Q is selected from the group consisting of hydrogen and methyl, and X is selected from the group consisting of chlorine and bromine. Trimethylphosphine is used in the above equation to illustrate a hydrocarbyl phosphine, and the Formula I represents a general formula for the 1,1-dihalophospholenium halides employed in the process of the invention.

In the formula of the product compounds (II) obtained by the process of the invention, the broken line is present to show that certain 1-halophospholene products of the process exist in two structural isomeric forms, i.e., that form wherein the double bond is located between the carbon atoms at positions 2 and 3 (hereinafter referred to as 2-phospholene) and that form wherein the double bond is located between the carbon atoms at positions 3 and 4 (hereinafter referred to as a 3-phospholene). Y is hydrogen attached to whichever carbon at positions 2 and 4 is not part of said double bond.

The temperature range employed in carrying out the process of the invention can be from about 0° C. to whatever is reflux temperature for the particular reaction mixture. Preferably, the process of the invention is carried out at a temperature of from about 20° C. to about 45° C.

The rate of reaction and product yield are advantageously increased by employing the phospholenium halide (I) in a proportion exceeding stoichiometric requirements.

The 1-halophospholene compounds (II) obtained by the process of the invention are susceptible to oxidation in the presence of air, particularly when heated. Recoverable yields of the product compounds (II) are therefore enhanced by carrying out the process under an inert gas atmosphere such as nitrogen.

Similarly, recoverable yields are improved by carrying out the process of the invention under anhydrous conditions.

The reaction between the phospholenium halide (I) and the hydrocarbyl phosphine generally occurs rapidly, and its progress can be followed by conventional analytical techniques such as infra-red spectral analysis, nuclear magnetic resonance analysis and like techniques. For example, as the compounds (II) are formed, nuclear magnetic resonance analysis will detect the appearance of those absorption bands in the spectra of the reaction mixture, which are characteristic of the product compounds (II).

Completion of the reaction can also be determined by visually observing the cessation of consumption of phospholenium halide reactant (I) in the reaction mixture.

Upon completion of the reaction, the desired product (II) is recovered from the reaction mixture by conventional techniques. For example, the reaction mixture is filtered to remove solids, and the 1-halophospholene compounds (II) are then isolated from the filtrate, employing conventional techniques such as evaporation of solvent, distillation, counter-current extraction and like procedures.

As previously described, the product (II) obtained when the starting phospholenium halide (I) is 1,1-dichloro-3-methyl-3-phospholenium chloride, will be the corresponding 2-phospholene, i.e.: 1-chloro-3-methyl-2-phospholene.

The product obtained when the starting phospholenium halide (I) is 1,1-dichloro-3,4-dimethyl-3-phospholenium chloride, is a mixture of the corresponding 2-phospholene and 3-phospholene isomers.

When the starting phospholenium halide reactant (I) is a bromide, i.e.: X represents bromine in the Formula I, the corresponding 3-phospholene is obtained. In addition, the corresponding 1-bromo-2-phospholene can be obtained in admixture with the 3-phospholene isomer, depending upon the reaction conditions employed. When carried out at ambient temperatures (circa 25° C.), the product obtained will be the 3-phospholene, substantially free of the corresponding 2-phospholene isomer. Heating the reaction mixture promotes the formation of the 2-phospholene isomer, and substantial proportions are obtained by heating the reaction mixture in excess of about 40° C.

Both structural isomeric forms of Formula II, when obtained in admixture are useful and for many purposes can be utilized in admixture. When desired however, they are readily separated from each other by conventional techniques such as fractional distillation chromatographic separation, countercurrent extraction and like techniques.

The inert organic solvent employed in the process of the invention can be any organic solvent which does not itself enter into or in any way interfere with the desired course of the reaction. Examples of such solvents are the aliphatic hydrocarbons such as n-hexane and cyclohexane; aromatic hydrocarbons such as benzene, toluene, xylene and the like. Preferred as the inert solvents in the process of the invention are chlorinated hydrocarbons such as methylene chloride, chloroform, carbon tetrachloride, 1,2-dichloroethane, chlorobenzene and the like.

The volume of organic solvent employed in the process of the invention is not critical, and is governed generally by the requirement that preferably there should be sufficient solvent present in the reaction mixture to maintain the reaction product (II) in solution while the reaction is in progress.

The hydrocarbyl phosphines employed as reactants in the process of the invention are derivatives of phosphine wherein from 1 to 3 hydrogen atoms have been replaced by a hydrocarbyl group. Preferably, the hydrocarbyl group substituent has from 1 to 12 carbon atoms, inclusive.

The term "hydrocarbyl" as used in this specification and claims means the monovalent moiety obtained upon removal of a hydrogen atom from a hydrocarbon. Illustrative of hydrocarbyl are alkyl groups such as methyl, ethyl, propyl, butyl, pentyl, hexyl, heptyl, octyl, nonyl, decyl, undecyl, dodecyl and the isomeric forms thereof; aryl groups such as phenyl, o-tolyl, m-tolyl, p-tolyl, p-ethylphenyl, xylyl, diphenyl, naphthyl and the like; aralkyl groups such as benzyl, p-methylbenzyl, phenylethyl, phenylbutyl, phenylhexyl and the like.

Hydrocarbyl phosphines can be represented by the formula

(III)

wherein $R_1$, $R_2$ and $R_3$ are each hydrocarbyl as defined above. $R_1$ and $R_2$ can also be hydrogen, in the Formula III, and are preferably hydrogen when $R_3$ is a hydrocarbyl of 12 carbon atoms or more.

Hydrocarbyl phosphines are well known in the art, as is their preparation. Representatives of hydrocarbyl phosphines are methylphosphine, butylphosphine, octylphosphine, phenylphosphine, p-ethylphenylphosphine, benzylphosphine, 2,4,6-trimethylphenylphosphine, dimethylphosphine, dioctylphosphine, diphenylphosphine, di-2,5-xylylphosphine, diphenethylphosphine, dibenzylphosphine, dinaphthylphosphine, trimethylphosphine, trioctylphosphine, diethylphenylphosphine, dibenzylbutylphosphine, tri-p-tolylphosphine, tri-2,5-xylylphosphine, tribenzylphosphine, triphenethylphosphine, tri(2-phenylphenyl)phosphine, benzylbutyl-p-tolylphosphine, diethylnaphthylphosphine, and the like. Methods for the preparation of hydrocarbylphosphines are found in the text Organophosphorus Compounds, Kosolapoff, John Wiley & Sons Pub. Inc., New York, New York (1950), Chapter 2.

The 1-halophospholenium halides (I) employed in the process of the invention are well known compounds, as is their preparation. Thus, the compounds 1-chloro-3-methyl-3-phospholenium chloride; 1-chloro-3,4-dimethyl-3-phospholenium chloride; 1-bromo-3-methyl-3-phospholenium bromide and 1-bromo - 3,4 - dimethyl-3-phospholenium bromide can all be prepared by, for example, the method of Hasserodt et al., Tetrahedron, vol. 19, pps. 1562–75 (1963). In general, this method comprises the Diels-Alder reaction of equimolar proportions of the corresponding conjugated diene with the appropriate phosphorus trihalide selected from the group consisting of phosphorus trichloride and phosphorus tribromide, in the presence of a compound, such as copper stearate, which will inhibit polymerization of the diene reactant.

In the early literature, the ionic nature of compounds of the Formula I was not appreciated, and so they are sometimes referred to therein as 1,1,1-trihalophospholenes. The system of nomenclature used throughout the specification and claims is illustrated by the following examples:

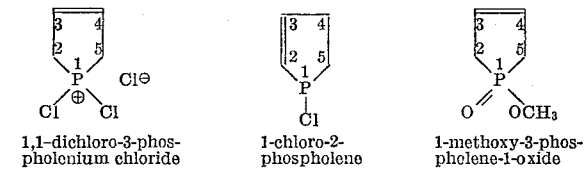

1,1-dichloro-3-phospholenium chloride    1-chloro-2-phospholene    1-methoxy-3-phospholene-1-oxide Historically, adducts formed by the Diels-Alder reaction of a 1,3-diene were assigned a structure having the double bond in the 3 position. It is now known that when phospholenium halides undergo reaction, for example reduction, the product may be the corresponding 3-isomer, or the 2-isomer or a mixture thereof. It is therefore possible that Diels-Alder reaction compounds of Formula I also exist in an isomeric form where the double bond is located in the 2-position or in a mixture or an equilibrium mixture of both isomers. It is to be understood therefore, that the Diels-Alder reaction adducts illustrated by the general Formula I and employed in the process of the invention, are intended to embrace and represent all the possible adduct isomers prepared by the Diels-Alder reaction of the corresponding conjugated diene with the appropriate phosphorus trihalide.

The 1-halophospholene product compounds (II) prepared by the process of the invention are useful as intermediates in a number of syntheses. Illustratively, following the procedure of Hasserodt et al., supra, for preparing phospholene-1-oxide compounds, the 1-halophospholene compounds (II) produced by the process of the invention may be reacted with aliphatic alcohols such as methanol, ethanol, propanol, butanol, and the like or with phenol. The reaction is carried out in the presence of air and a tertiary amine acid acceptor such as a trialkylamine, and yields the corresponding 1-alkoxy- and 1-phenoxy-phospholene 1-oxides. The 1-alkoxy and 1-phenoxy-phospholene-1-oxides are useful catalysts for preparing carbodiimides from isocyanates. For example, when 1-bromo-3-methyl-3-phospholene (as obtained in Example 8 of the specification) is reacted with methanol in the presence of triethylamine and air, the product is 1-methoxy-3-methyl-3-phospholene-1-oxide. This latter compound is a known catalyst for preparing carbodiimides from isocyanates (Arbuzov et al., Doklady Akademii Nauk SSSR, vol. 170, No. 3, pps. 585–588, September 1966). Similarly, 1-chloro-3-methyl-2-phospholene as obtained in Examples 1–5 can be reacted with methanol in the presence of air and triethylamine to prepare 1-methoxy-3-methyl-2-phospholene-1-oxide, a selective solvent for extraction of aromatics (see U.S. Pat. 3,345,287).

The following examples describe the manner and process of making and using the invention, and set forth the best mode contemplated by the inventors of carrying out the invention but are not to be construed as limiting.

EXAMPLE 1

To a slurry of 87.3 gms. (0.425 mole) of 1,1-dichloro-3-methyl-3-phospholenium chloride (Hasserodt et al., supra) and 75 ml. of benzene, there is added with stirring 105 gms. (0.40 mole) of triphenylphosphine in 75 ml. of benzene. Immediately upon admixture, a clear solution is formed, followed by precipitation of a cream colored material. Precipitation ceases in about 10 minutes. The supernatant liquid is decanted and the residue triturated three times with 100 ml. portions of benzene. After each trituration, the triturate is decanted and combined with the first supernatant decanted. The combined supernatant and triturates are distilled under, a pressure of 14 mm. to 15 mm. of mercury, and at a temperature of 72° C. to 74° C. to give 13.8 gms. (24.1% of theory) of 1-chloro-3-methyl-2-phospholene in the form of a colorless liquid. Upon redistillation, pure 1-chloro-3-methyl-2-phospholene is obtained having a boiling point of 64° C. to 65° C./9.0 mm. of mercury.

Analysis.—Calcd. for $C_5H_8ClP$ (percent): C, 44.61; H, 5.95; P, 23.05. Found (percent): C, 44.60; H, 6.00; P, 23.00.

The assigned structure of the product is confirmed by proton nuclear magnetic resonance analysis.

EXAMPLE 2

To a mixture of 35.1 gms. (0.171 mole) of 1,1-dichloro-3-methyl-3-phospholene chloride (Hasserodt et al., supra) and 25 ml. of dichloromethane, there is added with stirring 44.0 gms. (0.169 mole) of triphenylphosphine in 25 ml. of dichloromethane. A clear, dark red solution is immediately obtained, which upon distillation under a pressure of 22 mm. of mercury and at a temperature of 72° C. to 80° C. gives a distillate which is 10.1 gms. (44% of theory) of 1-chloro-3-methyl-2-phospholene. The assigned structure of the product is confirmed by nuclear magnetic resonance analysis.

EXAMPLE 3

To a mixture of 38.8 gms. (0.189 mole) of 1,1-dichloro-3-methyl-3-phospholenium chloride (method of Hasserodt et al., supra) and 50 ml. of dichloromethane, there is added with stirring 49.5 gms. (0.189 mole) of solid triphenylphosphine. A clear, dark red solution is immediately obtained, which upon distillation under a pressure of 25 mm. of Hg and at a temperature of 70° C. gives a distillate which is 11.0 gms. (43.3% of theory) of 1-chloro-3-methyl-2-phospholene. The assigned structure of the product is confirmed by nuclear magnetic resonance analysis.

EXAMPLE 4

A suitable reaction vessel is charged with 47.8 gms. (0.232 mole) of 1,1-dichloro-3-methyl-3-phospholenium chloride (Hasserodt et al., supra) and 60.8 gms. (0.232 mole) of triphenylphosphine. To the resulting mixture of solids there is added with stirring 75 ml. of dichloromethane. A clear dark red solution is immediately formed, which upon distillation under a pressure circa 22 mm. of mercury and at a temperature of about 70° C. to 80° C. gives 15.7 gms. (50.3% of theory) of a distillate which is 1-chloro-3-methyl-2-phospholene.

Similarly, using the above procedure but replacing the triphenylphosphine as used therein with an equal molar proportion of the following hydrocarbyl phosphines: methylphosphine, butylphosphine, octylphosphine, phenylphosphine, p-ethylphenylphosphine, benzylphosphine, dimethylphosphine, dioctylphosphine, diphenylphosphine di-2,5-xylylphosphine, diphenethylphosphine, dibenzylphosphine, trimethylphosphine, diethylphenylphosphine, dibenzylbutylphosphine, tri-p-tolylphosphine, tri-2,5-xylylphosphine, tribenzylphosphine, triphenethylphosphine, diethylnapthylphosphine and benzylbutyl-p-tolylphosphine, respectively, there is obtained in each instance 1-chloro-3-methyl-2-phospholene.

EXAMPLE 5

To a mixture of 5.3 gms. (0.026 mole) of 1,1-dichloro-3-methyl-3-phospholenium chloride (Hasserodt et al., supra) and 25 ml. of chloroform, there is added with stirring 5.25 gms. (0.026 mole) of tributylphosphine. A clear, dark red-brown solution is immediately obtained, which upon distillation under a pressure of 8.0 mm. of mercury and at a temperature of 61° C. to 75° C. gives a distillate which is 1.8 gms. (51.4% of theory) of 1-chloro-3-methyl-2-phospholene. The assigned structure of the product is confirmed by nuclear magnetic resonance analysis.

EXAMPLE 6

A round bottom flask is charged with 43.5 gms. (0.198 mole) of 1,1 - dichloro - 3,4 - dimethyl-3-phospholenium chloride (Hasserodt et al., supra) and 51.9 gms. (0.198 mole) of triphenylphosphine. The flask is then additionally charged with 50 ml. of dichloro methane and the mixture stirred. There is immediately obtained a clear, brown solution. After stirring for about 30 minutes, the reaction mixture is distilled at a temperature of 68° C. to 72° C. and under a pressure of 14 mm. of mercury to give 12.7 gm. (43.2% of theory) of a colorless distillate which is a mixture of 1-chloro-3,4,-dimethyl-2-phospholene and 1-chloro-3,4 - dimethyl - 3 - phospholene. Nuclear magnetic resonance analysis confirms the assigned structure of the products and indicates the relative proportion of isomers to be 29% of the 3-phospholene and 71% of the 2-phospholene isomer.

EXAMPLE 7

To a slurry of 62.3 gms. (0.184 mole) of 1,1-dibromo-3-methyl-3-phospholenium bromide (Hasserodt et al., supra) and 150 ml. of dichloromethane there is added with stirring 48.21 gms. (0.184 mole) of triphenylphosphine in 50 ml. of dichloromethane. An additional 50 ml. of dichloromethane is then added. The slurry mixture is immediately transformed to a clear, red-brown solution. After about 30 minutes the reaction mixture is seeded with solid obtained from treating an aliquot with excess benzene, and a cream colored precipitate immediately forms. The reaction mixture is filtered under a blanket or nitrogen gas. The filtrate is concentrated under vacuum using a rotary evaporator, at a temperature of circa 40° C., leaving a gummy residue. To the residue there is added sufficient dichloromethane to dissolve the gum, and then there is added 200 ml. of benzene. The resulting solution is filtered, and the filtrate is then distilled under a pressure of 8.0 mm. of Hg and at a temperature of 68° C. to 72.5° C. to give 13.3 gms. (41% of theory) of a mixture of 1-bromo-3-methyl-2-phospholene and 1-bromo-3-methyl-3-phospholene. Nuclear magnetic resonance analysis confirms the assigned structures of the product and shows the relative proportions of the isomers to be 27% of the 2-phospholene and 73% of the 3-phospholene isomer.

Similarly, using the above procedure but replacing the 1,1-dibromo-3-methyl-3-phospholenium bromide as used therein with an equal proportion of 1,1-dibromo-3,4-dimethyl-3-phospholenium bromide, there is obtained a mixture of 1-bromo-3,4-dimethyl-3-phospholene and 1-bromo-3,4-dimethyl-2-phospholene.

EXAMPLE 8

To a mixture of 60.0 gms. (0.18 mole) of 1,1-dibromo-3-methyl-3-phospholenium bromide (Hasserodt et al., supra) and 100 ml. of dichloromethane, there is added with stirring 47.2 gms. (0.18 mole) of triphenylphosphine in 50 ml. of dichloromethane. Upon addition of the triphenylphosphine, the brick-red slurry of phospholenium bromide is immediately converted to a reaction mixture characterized as a clear, yellow supernatant and a yellow-cream colored precipitate. The reaction mixture is filtered, and the residue washed with dichloromethane. An aliquot of the filtrate is found by nuclear magnetic resonance analysis to contain 1-bromo-3-methyl-3-phospholene.

The 1-bromo-3-methyl-3-phospholene is separated from the solvent mixture by distillation under a pressure circa 15 mm. of Hg and at a temperature of about 80° C. to 85° C.

We claim:

1. A process for preparing a 1-halophospholene selected from the group consisting of 1-halo-3-methylphospholenes and 1-halo-3,4-dimethylphospholenes which comprises reacting in the presence of an inert organic solvent and at a temperature of from 0° C. to reflux temperature the corresponding 1,1-dihalophospholenium halide with a hydrocarbyl phosphine; the halo in each instance being selected from the class consisting of chlorine and bromine.

2. The process of claim 1 wherein said solvent is a chlorinated hydrocarbon.

3. The process of claim 1 wherein said hydrocarbyl phosphine is of the formula:

wherein $R_1$, $R_2$ and $R_3$ are each hydrocarbyl of 1 to 12 carbon atoms, inclusive, and additionally $R_1$ and $R_2$ can each be hydrogen.

4. A process according to claim 3 wherein said hydrocarbyl phosphine is triphenylphosphine.

5. A process according to claim 3 wherein said hydrocarbyl phosphine is tributylphosphine.

6. The process of claim 1 wherein the proportion of phospholenium halide reactant employed is in excess of stoichiometric requirements.

7. The process of claim 1 wherein said phospholenium halide is 1,1-dichloro-3-methyl-3-phospholenium chloride whereby there is obtained 1-chloro-3-methyl-2-phospholene.

8. The process of claim 1 wherein said phospholenium halide is 1,1-dichloro-3,4-dimethyl-3-phospholenium chloride whereby there is obtained a mixture of 1-chloro-3,4-dimethyl - 3 - phospholene and 1-chloro-3,4-dimethyl-2-phospholene.

9. The process of claim 1 wherein said phospholenium halide is 1,1-dibromo-3-methyl-3-phospholenium bromide whereby there is obtained 1-bromo-3-methyl-3-phospholene.

10. The process of claim 1 wherein said phospholenium halide is 1,1-dibromo-3-methyl-3-phospholenium bromide and the process is carried out at a temperature of from about 40° C. to reflux temperature, whereby there is obtained a mixture of 1-bromo-3-methyl-3-phospholene and 1-bromo-3-methyl-2-phospholene.

11. A process for preparing a 1-halophospholene selected from the group consisting of 1-halo-3-methylphospholenes and 1-halo-3,4-dimethylphospholenes which comprises reacting in the presence of an inert organic solvent; and at a temperature of from 0° C. to reflux temperature;
(A) a stoichiometric excess of the corresponding 1,1-dihalophospholenium halide; with
(B) a hydrocarbyl phosphine of formula:

wherein $R_1$, $R_2$ and $R_3$ are each hydrocarbyl of 1 to 12 carbon atoms, inclusive, and additionally $R_1$ and $R_2$ can be hydrogen;
the halo in each instance being selected from the group consisting of chlorine and bromine.

12. The process of claim 11 wherein said hydrocarbyl phosphine is triphenylphosphine.

13. The process of claim 11 wherein said hydrocarbyl phosphine is tributylphosphine.

14. The process of claim 11 wherein said solvent is a chlorinated hydrocarbon.

References Cited

FOREIGN PATENTS 1,011,974   12/1965   United Kingdom ___ 260—543 P
  210,155    6/1968   U.S.S.R. _____ 260—543 P

OTHER REFERENCES

Coggon et al., V.A.C.S. 92:19, September 1970, pp. 5779–80.

LORRAINE A. WEINBERGER, Primary Examiner

R. D. KELLY, Assistant Examiner

U.S. Cl. X.R.

260—606.5 P